US010570780B2

(12) United States Patent
Ramlaoui et al.

(10) Patent No.: US 10,570,780 B2
(45) Date of Patent: Feb. 25, 2020

(54) EXHAUST ASSEMBLY MOUNTING CONFIGURATION

(71) Applicant: ROHR, INC., Chula Vista, CA (US)

(72) Inventors: Jihad Ramlaoui, Chula Vista, CA (US); Pablo T. Sanz Martinez, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 251 days.

(21) Appl. No.: 15/803,514

(22) Filed: Nov. 3, 2017

(65) Prior Publication Data

US 2019/0136718 A1     May 9, 2019

(51) Int. Cl.
| | |
|---|---|
| *F01D 25/30* | (2006.01) |
| *F02K 1/04* | (2006.01) |
| *B60K 13/04* | (2006.01) |
| *F01D 25/24* | (2006.01) |
| *F01N 13/18* | (2010.01) |
| *F01D 9/02* | (2006.01) |
| *F01D 25/28* | (2006.01) |

(52) U.S. Cl.
CPC .............. *F01D 25/30* (2013.01); *B60K 13/04* (2013.01); *F01D 25/24* (2013.01); *F01N 13/1805* (2013.01); *F02K 1/04* (2013.01); *F01D 9/02* (2013.01); *F01D 25/28* (2013.01); *F05D 2300/50212* (2013.01)

(58) Field of Classification Search
CPC . F02K 1/04; F01D 25/24; F01D 25/28; F01D 25/30; F01D 9/02; B60K 13/04; F01N 13/1805
See application file for complete search history.

(56) References Cited

U.S. PATENT DOCUMENTS

| | | | |
|---|---|---|---|
| 2,697,907 | A | 12/1954 | Aubatz |
| 3,536,262 | A | 10/1970 | Hachard |
| 3,703,259 | A | 11/1972 | Sturgess et al. |
| 3,829,020 | A | 8/1974 | Stearns |

(Continued)

FOREIGN PATENT DOCUMENTS

| | | |
|---|---|---|
| EP | 3018305 | 5/2016 |
| GB | 1119915 | 7/1968 |

OTHER PUBLICATIONS

European Patent Office, European Search Report dated Mar. 31, 2019 in Application No. 18204181.4.

*Primary Examiner* — Craig Kim
(74) *Attorney, Agent, or Firm* — Snell & Wilmer L.L.P.

(57) ABSTRACT

An exhaust assembly may include an exhaust body and a pivoting attachment feature. The exhaust body, such as a center body or a nozzle, may be configured to direct an annular exhaust stream exiting from a gas turbine engine. The pivoting attachment feature may be coupled the exhaust body and may be configured to pivotally couple the exhaust body to an engine flange. The pivoting attachment feature may be one of a plurality of attachment features circumferentially distributed around the exhaust body. The exhaust body may be a center body and the plurality of attachment features may be coupled to a radially inward surface the center body. The pivoting attachment feature may enable a degree of relative thermal expansion movement between the engine flange/turbine exhaust case and the exhaust body while mitigating detrimental thermal loads, according to various embodiments.

18 Claims, 5 Drawing Sheets

(56) References Cited

U.S. PATENT DOCUMENTS

| | | | | |
|---|---|---|---|---|
| 4,452,038 | A | * | 6/1984 | Soligny .................... F02K 1/04 |
| | | | | 239/397.5 |
| 5,320,307 | A | * | 6/1994 | Spofford ................ B64D 27/18 |
| | | | | 244/54 |
| 8,322,651 | B2 | * | 12/2012 | Levert .................... B64C 27/26 |
| | | | | 244/53 R |
| 9,551,239 | B2 | | 1/2017 | Byrne et al. |
| 9,784,215 | B2 | | 10/2017 | Lu et al. |
| 2015/0075176 | A1 | | 3/2015 | Ruthemeyer et al. |
| 2015/0226083 | A1 | | 8/2015 | Renggli et al. |
| 2016/0115904 | A1 | | 4/2016 | Sutterfield et al. |
| 2017/0138219 | A1 | | 5/2017 | Knight et al. |

* cited by examiner

EXHAUST ASSEMBLY MOUNTING CONFIGURATION

FIELD

The present disclosure relates to exhaust assemblies of gas turbine engines and, more specifically, to exhaust body mounting configurations.

BACKGROUND

Gas turbine engines generally include an exhaust assembly that directs high temperature exhaust air out of the engine to generate thrust. Exhaust assemblies typically include a center body surrounded by a nozzle. The engine exhaust stream exits the engine's turbine stage through an annular passageway defined between the center body and the nozzle (e.g., an annular exhaust stream).

Exhaust bodies, such as the center body and/or the nozzle, are often subject to the extreme heat of the annular exhaust stream. While components of conventional exhaust assemblies have often been made from metallic materials, the trend towards higher maximum temperatures of exhaust streams has led some in the industry to propose utilizing exhaust center bodies and/or nozzles that are made from ceramic components, such as matrix composite (CMC) materials, and other high temperature capability materials. However, a substantial mismatch of the coefficients of thermal expansion between metallic and ceramic components of a conventional exhaust assembly would impart thermal stress and strain on the conventional exhaust assembly.

SUMMARY

In various embodiments, the present disclosure provides an exhaust assembly that includes an exhaust body configured to direct an annular exhaust stream and a pivoting attachment feature coupled to the exhaust body and configured to pivotally couple the exhaust body to an engine flange. The pivoting attachment feature may be one of a plurality of attachment features circumferentially distributed around the exhaust body. The exhaust body may be a center body and the plurality of attachment features may be coupled to a radially inward surface the center body.

In various embodiments, the exhaust body is a nozzle. In various embodiments, the pivoting attachment feature includes a first mounting bracket coupled to the exhaust body, a second mounting bracket configured to be coupled to the engine flange, and a link extending between and pivotally coupled to the first mounting bracket and the second mounting bracket. The pivoting attachment feature may include a first pivot axis and a second pivot axis, wherein the first pivot axis is between the first bracket and the link and the second pivot axis is between the second bracket and the link. In various embodiments, a first coefficient of thermal expansion of the exhaust body is less than a second coefficient of thermal expansion of the engine flange.

Also provided herein, according to various embodiments, is a gas turbine engine that includes turbine exhaust case comprising an engine flange, an exhaust body, and a pivoting attachment feature. The pivoting attachment feature couples the exhaust body to the engine flange of the turbine exhaust case, according to various embodiments. The pivoting attachment feature may include a first pivot axis and a second pivot axis, wherein the first pivot axis is between the first bracket and the link and the second pivot axis is between the second bracket and the link.

In various embodiments, the first bracket is coupled to the exhaust body via a bolt, wherein a longitudinal axis of the link intersects a centerline axis of the bolt at an interface between the first bracket and the exhaust body when the engine flange is in a thermally expanded state. In various embodiments, the first bracket is coupled to the exhaust body via a pair of circumferentially spaced apart bolts, wherein a plane that extends through centerline axes of the pair of bolts intersects a longitudinal axis of the link at an interface between the first bracket and the exhaust body when the engine flange is in a thermally expanded state.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
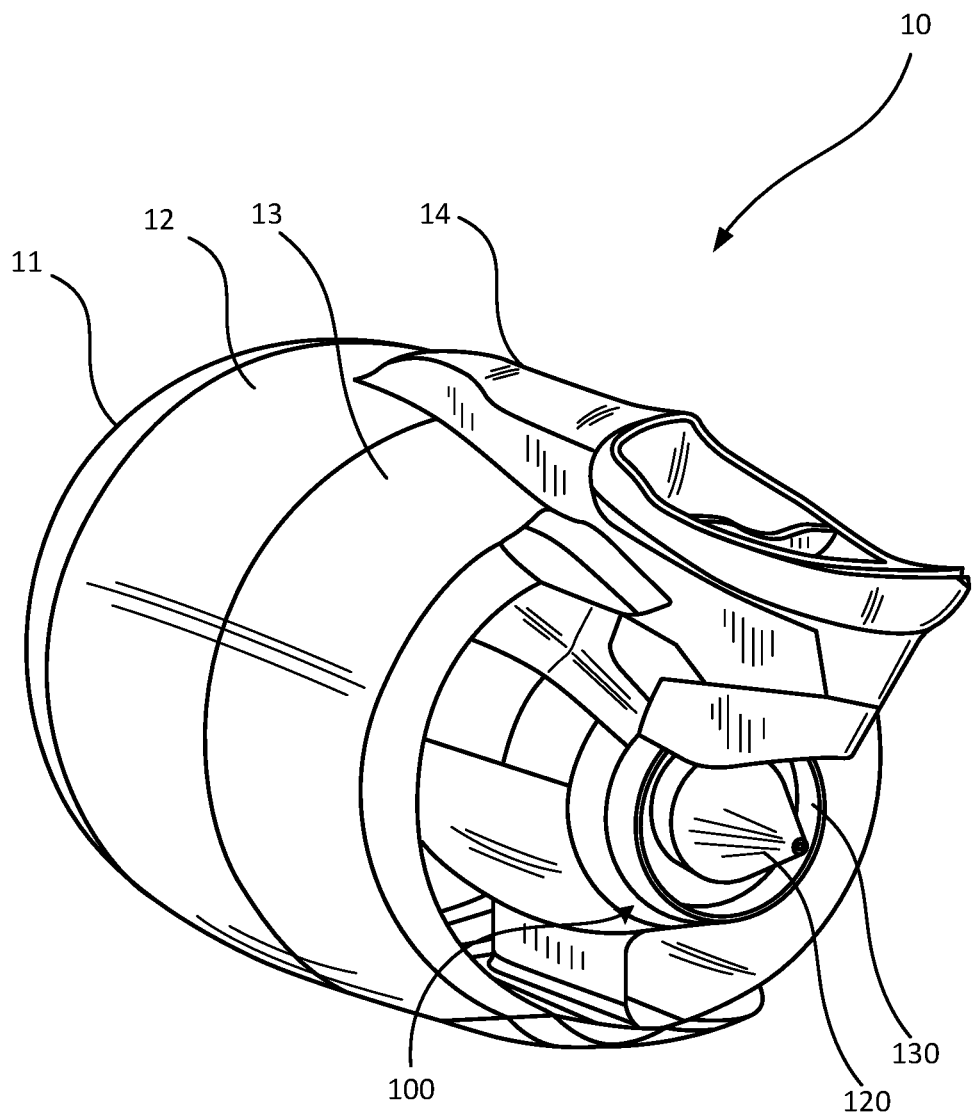
FIG. 1 is a perspective view of a nacelle, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, a first component that is "radially outward" of a second component means that the first component is positioned at a greater distance away from an axis, such as an engine central longitudinal axis 5 of a gas turbine engine 20 (FIG. 2), than the second component. Correspondingly, a first component that is "radially inward" of a second component means that the first component is positioned closer to the axis, such as the engine central longitudinal axis 5, than the second component.

Figure 2:
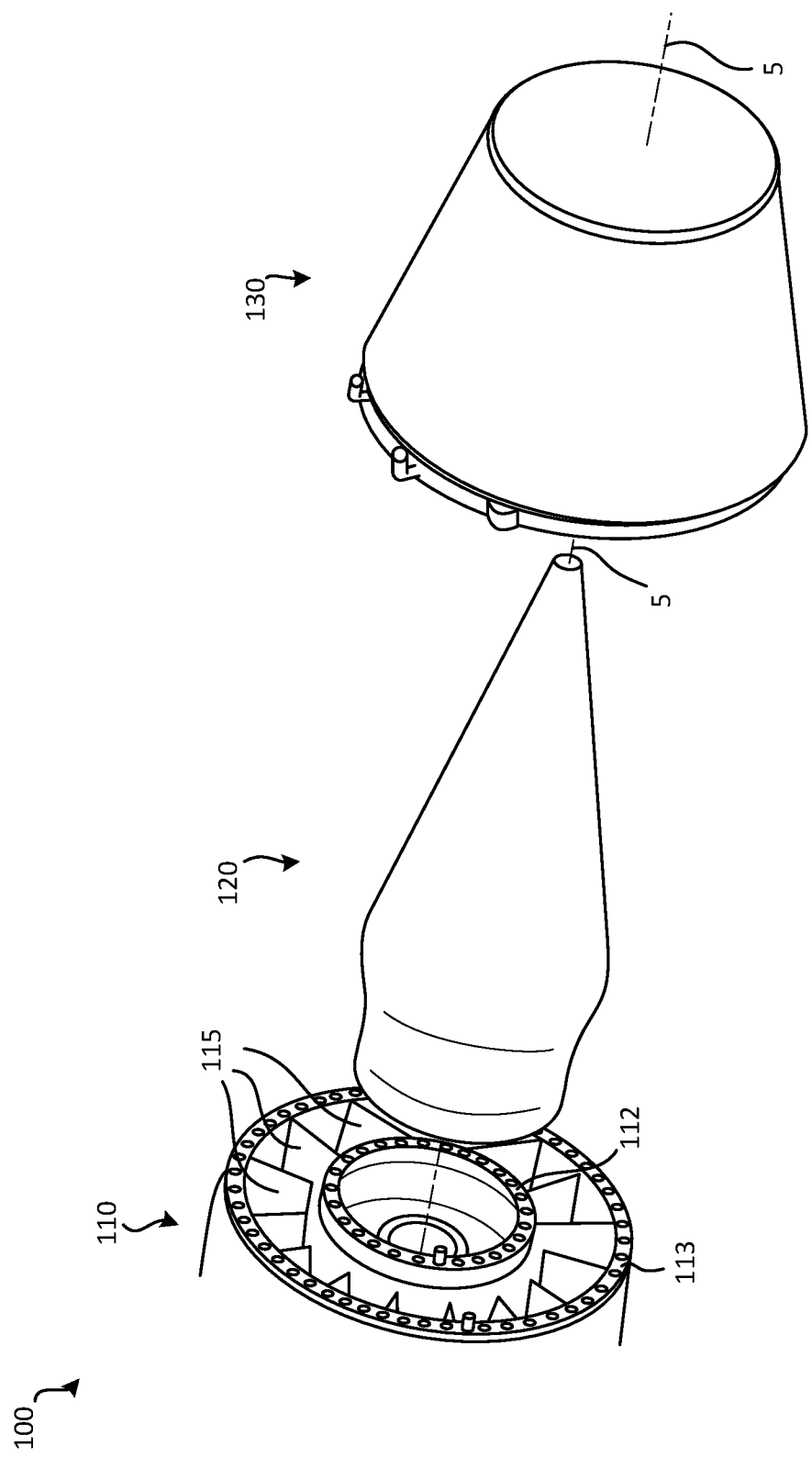
FIG. 2 is an exploded view of an exhaust assembly, in accordance with various embodiments.
Figure 3:
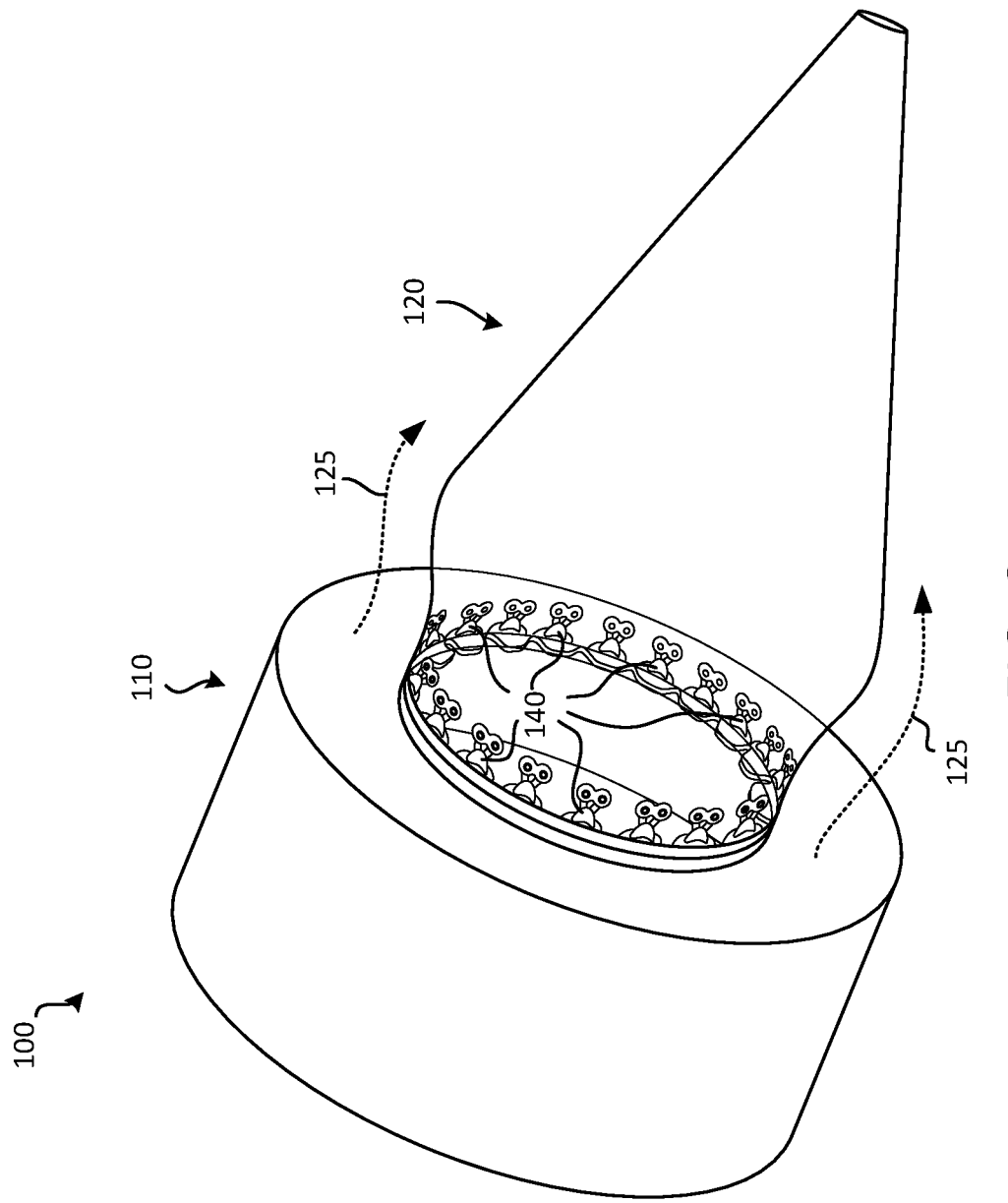
FIG. 3 is a schematic perspective view of an exhaust assembly, in accordance with various embodiments.

In various embodiments, and with reference to FIGS. 1, 2, and 3, an exhaust assembly 100 is provided that includes a mounting configuration that enables components having different coefficients of thermal expansion to be coupled together without experiencing substantial or excessive thermally induced stress. Referring to FIG. 1, a nacelle 10 for a gas turbine engine is illustrated, according to various embodiments. The nacelle 10 may include an inlet 11, a fan cowl 12, and a thrust reverser 13. The nacelle 10 may be coupled to a pylon 14, which may mount the nacelle 10 to an aircraft wing or aircraft body. Nacelle 10 may further include an exhaust assembly 100 that may include one or more exhaust bodies, such as center body 120 and/or nozzle 130, attached to a support structure, such as a turbine exhaust case 110 (FIG. 2). Hot gas exiting the gas turbine engine may flow between the nozzle 130 and the center body 120 (e.g., an annular exhaust stream 125). One or both of the center body 120 and the nozzle 130 may be attached to the gas turbine engine via one or more pivoting attachment features 140 (FIG. 3), as described in greater detail below. Generally, the pivoting attachment features 140 are configured to allow a degree of relative thermal expansion movement between the turbine exhaust case 110 and one or both of the exhaust bodies 120, 130 while mitigating detrimental thermal loads, according to various embodiments. In various embodiments, while the pivoting attachment features 140 are configured to allow for relative thermal expansion, collectively the pivoting attachment features 140 are capable of supporting loads emanating from and/or transferred between the exhaust body (e.g., the center body 120 or the nozzle 130) and the support structure (e.g., the turbine exhaust case 110). For example, the pivoting attachment features 140 may be configured to bear axial loads, circumferential loads, side loads, and/or resultant global moments.

In various embodiments, and with reference to FIG. 2, the turbine exhaust case 110 may include an inner structure 112 and an outer structure 113, with the annular exhaust passageway defined there between. A plurality of guide vanes 115 may be disposed in the annular exhaust passageway and may extend between the inner structure 112 and the outer structure 113. In various embodiments, the inner structure 112 is configured to support and be coupled to the center body 120 and the outer structure 113 is configured to support and be coupled to the nozzle 130, as described in greater detail below with reference to FIGS. 4A and 4B.

The exhaust bodies 120, 130 may be made from material that has a dissimilar coefficient of thermal expansion than the support structure (e.g., turbine exhaust case 110) to which it is attached/mounted. For example, the turbine exhaust case 110 may be made from a metallic material and the exhaust bodies 120, 130 may be made from a ceramic material. In various embodiments, the turbine exhaust case 110 is made from an austenitic nickel-chromium-based superalloy, as described in greater detail below, and the exhaust bodies 120, 130 is made from a ceramic matrix composite. Exhaust bodies 120, 130 made from ceramic materials, such as ceramic matrix composites, may have a reduced weight and improved thermal properties as compared to counterparts made from metallic materials.

In various embodiments, and with reference to FIG. 3, the one or more pivoting attachment features 140 of the exhaust assembly 100 enable and allow thermally induced movement, such as radial expansion, of the turbine exhaust case 110 relative to the center body 120 without applying potentially detrimental loads on the exhaust assembly 100 (i.e., mitigating build-up of potentially detrimental loads). In various embodiments, the exhaust assembly 100 includes at least four (4) circumferentially distributed pivoting attachment features 140. In various embodiments, the temperature of the annular exhaust stream 125 exiting the turbine exhaust case 110 may cause the turbine exhaust case 110 and the exhaust bodies 120, 130 to thermally expand at different rates due to the difference in coefficients of thermal expansion, which may lead to thermal loads being introduced between various components of the exhaust assembly. In various embodiments, the center body 120 may be coupled to the inner structure 112 of the turbine exhaust case 110 via pivoting attachment features 140, the nozzle 130 may be coupled to the outer structure 113 of the turbine exhaust case 110 via pivoting attachment features 140, or both the center body 120 and the nozzle 130 may be respectively attached via pivoting attachment features 140.

Figure 4:
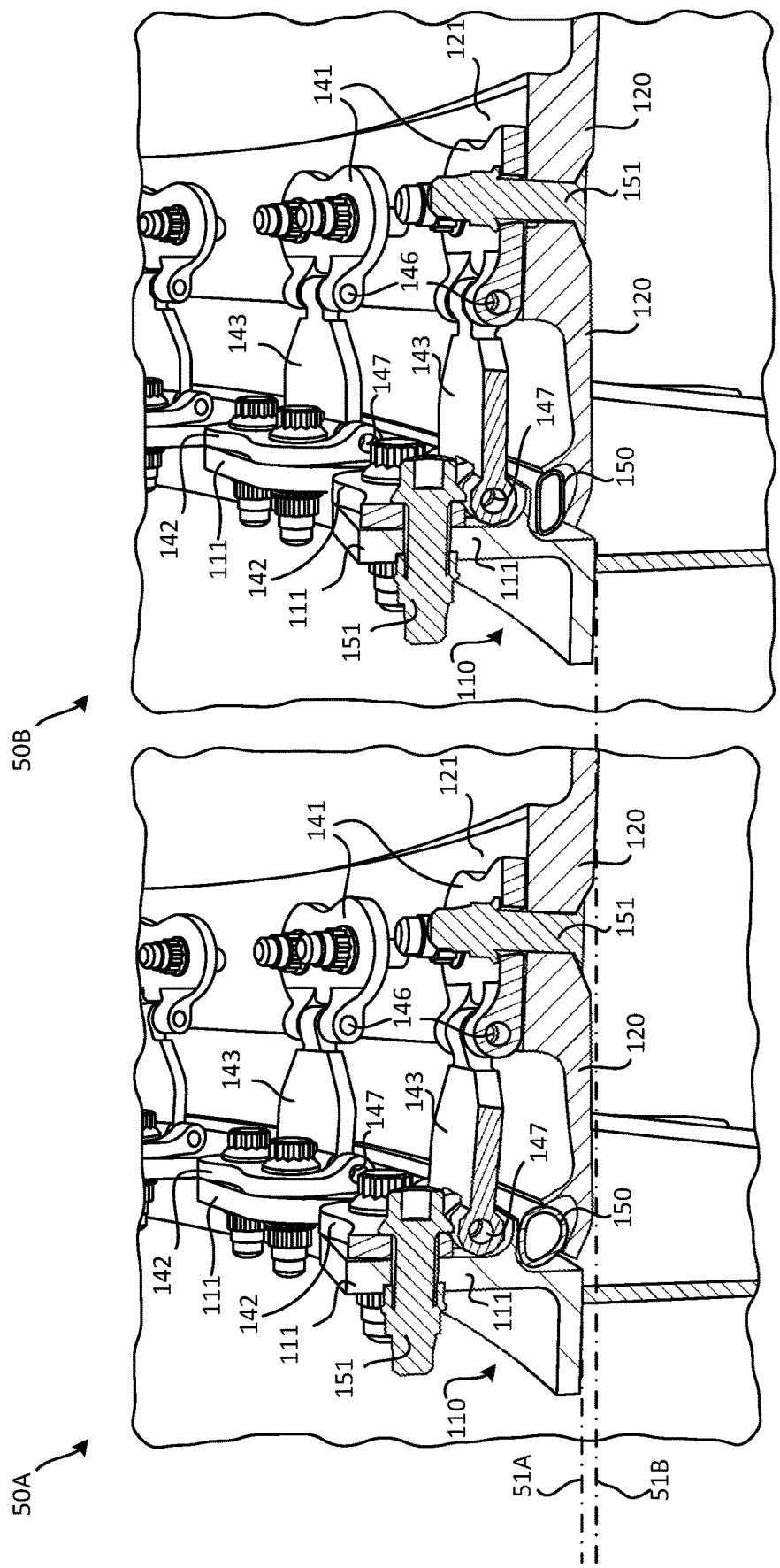
FIG. 4A is a cross-sectional perspective view of a mounting configuration of an exhaust assembly in a non-expanded state, in accordance with various embodiments.
FIG. 4B is a cross-sectional perspective view of a mounting configuration of an exhaust assembly in a thermally expanded state, in accordance with various embodiments.

FIGS. 4A and 4B show a non-expanded state 50A of the exhaust assembly and a thermally expanded state 50B of the exhaust assembly, respectively. That is, FIG. 4A shows the engine flange 111 of the turbine exhaust case 110 in a first, non-expanded radial position 51A while FIG. 4B shows the engine flange 111 of the turbine exhaust case 110 in a second, thermally expanded radial position 51B. This relative radial expansion between positions 51A and 51B may be caused in response to the gas turbine engine operating and emitting the hot annular exhaust stream 125 (FIG. 3), which heats the metallic engine flange 111 of the turbine exhaust case 110 and causes it to expand radially to a greater degree than the center body 120. The pivoting, radially adjusting configuration of the pivoting attachment feature(s) 140 enables this relative radial movement to be accommodated without excessive thermal loads introduced to the exhaust assembly 100 (as would occur if conventional, static, a non-pivoting mounting means were utilized).

In various embodiments, and with reference to FIGS. 4A and 4B, each pivoting attachment feature 140 includes a first mounting bracket 141 coupled to the center body 120, a second mounting bracket 142 coupled to the turbine exhaust case 110, and a link 143 extending between and pivotally coupled to the first mounting bracket 141 and the second mounting bracket 142. Accordingly, each pivoting attachment feature 140 may have two pivot points/axes, a first pivot axis 146 between the first bracket 141 and the link 143 and a second pivot axis 147 between the second mounting bracket 142 and the link 143. In various embodiments, the first mounting bracket 141 is mounted to a radially inward surface 121 of the center body 120 and the second mounting bracket 142 is mounted to an engine flange 111 of the support structure (e.g., the turbine exhaust case 110). Such a configuration enables radial relative movement of the engine flange 111 of the turbine exhaust case 110, relative to the center body 120, caused by a mismatch in coefficients of thermal expansion of the turbine exhaust case 110 (e.g., a metallic material) and the center body 120 (e.g., a ceramic material), according to various embodiments. In various embodiments, the axis of rotation of the first pivot axis 146 and the axis of rotation of the second pivot axis 147 of each pivoting attachment feature 140 of the exhaust assembly 100 are perpendicular to a respective radial plane of the center body 120.

Figure 5:
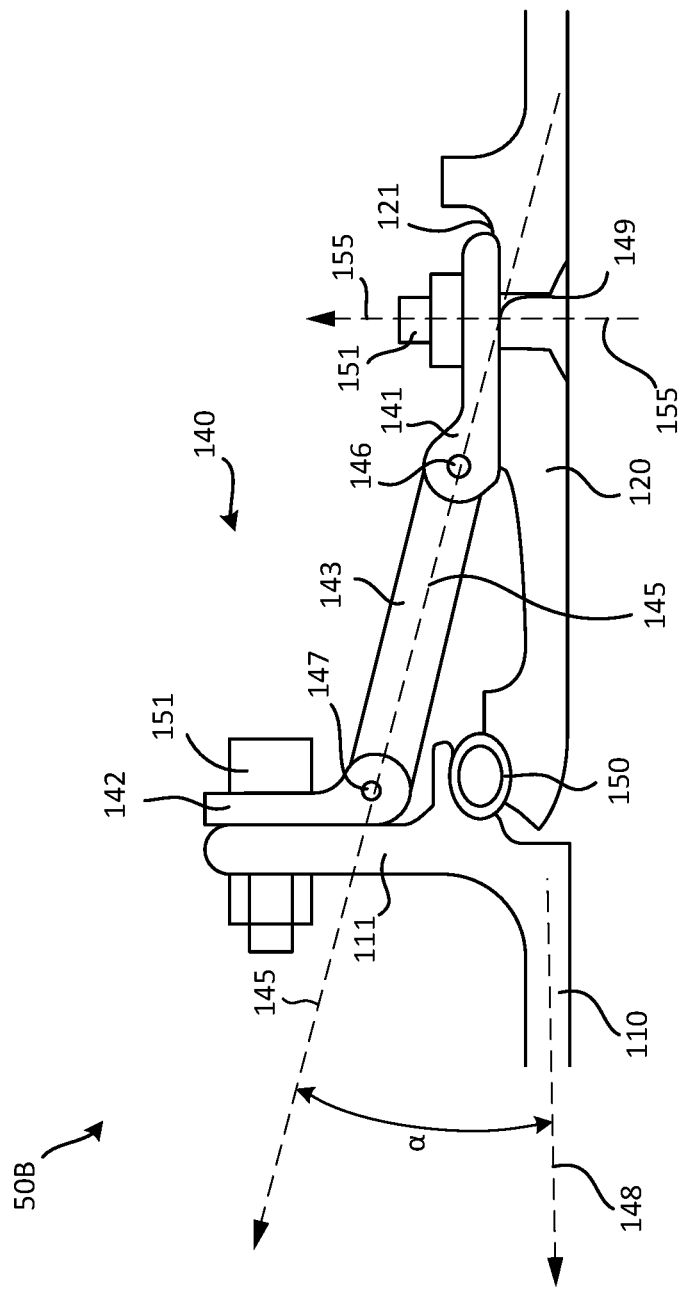
FIG. 5 is a schematic cross-sectional view of a pivoting attachment feature, in accordance with various embodiments.

In various embodiments, and with reference to FIGS. 4A, 4B, and 5, the mounting brackets 141, 142 may be coupled to the respective components via one or more bolts 151. In various embodiments, and with reference to FIG. 5, the pivoting attachment feature 140 may be configured to mitigate torque moment at the interface between the first mounting bracket 141 and the radially inward surface 121 of the center body 120. In various embodiments, the link 143 of the pivoting attachment feature 140 may be shape configured relative to the first and second mounting brackets 141, 142 to transmit inertial and net side pressure loads originating at the center body 120. In various embodiments, the first pivot axis 146 or the second pivot axis 147, but not both, may be a spherical axis that enables a degree of torsional relative movement of the turbine exhaust case 110 and the center body 120. For example, the first pivot axis 146 may be a spherical axis and second pivot axis 147 may be a linear rotational axis.

In various embodiments, for example, a longitudinal axis 145 of the link 143 intersects a centerline axis 155 of the bolt 151 that is anchoring the first bracket 141 to the center body 120. More specifically, the longitudinal axis 145 of the link 143 may intersect the centerline axis 155 of the bolt 151 at an interface 149 between the first bracket 141 and the center body 120 when the engine flange is in a thermally expanded state 50B. In various embodiments, the first bracket 141 may be coupled to the center body 120 via a pair of circumferentially spaced apart bolts, and a plane that extends through the centerline axes of the pair of bolts intersects the longitudinal axis 145 of the link 143 at an interface 149 between the first bracket 141 and the center body 120 when the engine flange is in a thermally expanded state. In various embodiments, angle "a" between longitudinal axis 145 of the link 143 and axis 148 of localized section of the turbine exhaust case 110 is minimized.

In various embodiments, the exhaust assembly 100 includes a sealing member 150 disposed radially between the engine flange 111 of the turbine exhaust case 110 and the center body 120. The sealing member 150 may be configured to prevent fluid from passing between the turbine exhaust case 110 and the center body 120. For example, the sealing member 150 may be configured to prevent flow leakage from exhaust flow 125 to inside the cavity of the center body 120. The sealing member 150 may be configured to resiliently and reversibly collapse when the engine flange 111 is in the thermally expanded state 50B (FIG. 4B). The sealing member 150 may be configured to collapse and expand without imparting significant loads between the engine flange 111 and the center body 120. For example, the sealing member 150 may maintain contact with the engine flange 111 and the center body 120 throughout the thermally induced relative movement between the two components. The sealing member 150 may be configured to be detachable from the exhaust assembly 100. The sealing member 150 may comprise a curved piece of relatively elastic material, for example, a metal having relatively elastic properties. In various embodiments, the sealing member 150 comprises an austenitic nickel-chromium-based alloy.

In various embodiments, the support structure (e.g., the engine flange 111 of the inner structure 112 of the turbine exhaust case 110) may be made from an austenitic nickel-chromium-based alloy such as Inconel®, which is available from Special Metals Corporation of New Hartford, N.Y., USA. In various embodiments, as mentioned above, the center body 120 and/or the nozzle 130 may be made from a ceramic matrix composite material. The exhaust bodies 120, 130 may comprise at least one of a carbon-carbon composite, a ceramic material, graphite, or any other suitable material. In various embodiments, a ceramic matrix composite may generally comprise one or more ceramic materials disposed on or within another material, such as, for example, a ceramic material disposed within a structure comprised of a fibrous material. Fibrous materials, such as carbon fiber, aramid fibers, fiberglass fibers, and the like may be formed into fibrous structures suitable for this purpose. Deposition of a ceramic material into or onto a fibrous material may be accomplished using chemical vapor infiltration (CVI), melt infiltration (MI), and slurry casting (SC) may be used, alone or in various combinations, to partially or fully impregnate a fibrous structure with the ceramic material. In various embodiments, exhaust bodies 120, 130 comprise multiple materials, or any material configuration suitable to enhance or reinforce the resiliency and/or support of the system when subjected to wear in an aircraft operating environment or to satisfy other desired electromagnetic, chemical, physical, or biological properties, for example radar signature, load capacity, and/or heat tolerance.

While numerous details and examples are included herein pertaining to exhaust assemblies of gas turbine engines, the present disclosure may be applied and/or implemented in conjunction with other systems, such as vehicles (e.g., a launch vehicle), a spacecraft, an unmanned aerial vehicle, a missile, an automobile, trucks, busses, trains, boats, submersible vehicles, or any other propulsion system, vehicle, apparatus, or device having materials with different coefficients of thermal expansion coupled together that are exposed to fluctuating temperatures.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. An exhaust assembly for a gas turbine engine comprising:
   an engine flange;
   an exhaust body configured to direct an annular exhaust stream;
   a pivoting attachment feature coupled to the exhaust body and configured to pivotally couple the exhaust body to the engine flange; and
   a sealing member disposed radially between the engine flange and the exhaust body, wherein the sealing member is configured to resiliently and reversibly collapse in response to the engine flange being in a thermally expanded state.

2. The exhaust assembly of claim 1, wherein the pivoting attachment feature is one of a plurality of attachment features circumferentially distributed around the exhaust body.

3. The exhaust assembly of claim 2, wherein the exhaust body is a center body and the plurality of attachment features are coupled to a radially inward surface the center body.

4. The exhaust assembly of claim 1, wherein the exhaust body is a nozzle.

5. The exhaust assembly of claim 1, wherein the pivoting attachment feature comprises a first mounting bracket coupled to the exhaust body, a second mounting bracket configured to be coupled to the engine flange, and a link extending between and pivotally coupled to the first mounting bracket and the second mounting bracket.

6. The exhaust assembly of claim 5, wherein the pivoting attachment feature comprises a first pivot axis and a second pivot axis, wherein the first pivot axis is between the first mounting bracket and the link and the second pivot axis is between the second mounting bracket and the link.

7. The exhaust assembly of claim 1, wherein a first coefficient of thermal expansion of the exhaust body is less than a second coefficient of thermal expansion of the engine flange.

8. A gas turbine engine comprising:
   turbine exhaust case comprising an engine flange;
   an exhaust body;
   a pivoting attachment feature coupling the exhaust body to the engine flange of the turbine exhaust case; and
   a sealing member disposed radially between the engine flange and the exhaust body, wherein the sealing member is configured to resiliently and reversibly collapse in response to the engine flange being in a thermally expanded state.

9. The gas turbine engine of claim 8, wherein the pivoting attachment feature is one of a plurality of attachment features circumferentially distributed around the exhaust body and the engine flange.

10. The gas turbine engine of claim 9, wherein the exhaust body is a center body and the plurality of attachment features are coupled to a radially inward surface the center body.

11. The gas turbine engine of claim 8, wherein the exhaust body is a nozzle.

12. The gas turbine engine of claim 8, wherein the pivoting attachment feature comprises a first mounting bracket coupled to the exhaust body, a second mounting bracket coupled to the engine flange, and a link extending between and pivotally coupled to the first mounting bracket and the second mounting bracket.

13. The gas turbine engine of claim 12, wherein the pivoting attachment feature comprises a first pivot axis and a second pivot axis, wherein the first pivot axis is between the first mounting bracket and the link and the second pivot axis is between the second mounting bracket and the link.

14. The gas turbine engine of claim 12, wherein the first mounting bracket is coupled to the exhaust body via a bolt, wherein a longitudinal axis of the link intersects a centerline axis of the bolt at an interface between the first mounting bracket and the exhaust body when the engine flange is in the thermally expanded state.

15. The gas turbine engine of claim 12, wherein the first mounting bracket is coupled to the exhaust body via a pair of circumferentially spaced apart bolts, wherein a plane that extends through centerline axes of the pair of bolts intersects a longitudinal axis of the link at an interface between the first mounting bracket and the exhaust body when the engine flange is in the thermally expanded state.

16. The gas turbine engine of claim 8, wherein a first coefficient of thermal expansion of the exhaust body is less than a second coefficient of thermal expansion of the engine flange.

17. The gas turbine engine of claim 16, wherein the exhaust body comprises a ceramic matrix composite.

18. A gas turbine engine comprising:
   turbine exhaust case comprising an engine flange;
   a center body; and a plurality of pivoting attachment features coupling the center body to the engine flange of the turbine exhaust case, wherein each pivoting attachment feature of the plurality of pivoting attachment features comprises a first mounting bracket coupled to the center body, a second mounting bracket coupled to the engine flange, and a link extending between and pivotally coupled to the first mounting bracket and the second mounting bracket;

wherein:
- the plurality of attachment features are circumferentially distributed around a radially inward surface of the center body;
- a first coefficient of thermal expansion of the center body is less than a second coefficient of thermal expansion of the engine flange;
- wherein the first mounting bracket is coupled to the exhaust body via a bolt; and
- wherein a longitudinal axis of the link intersects a centerline axis of the bolt at an interface between the first mounting bracket and the exhaust body in response to the engine flange being in a thermally expanded state.

* * * * *